(12) United States Patent
Li (10) Patent No.: US 12,137,225 B2
(45) Date of Patent: Nov. 5, 2024

(54) MULTI-ATLAS ENCAPSULATION OF IMMERSIVE MEDIA

(71) Applicant: ZTE Corporation, Guangdong (CN)

(72) Inventor: Qiuting Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 164 days.

(21) Appl. No.: 17/863,049

(22) Filed: Jul. 12, 2022

(65) Prior Publication Data

US 2022/0345714 A1    Oct. 27, 2022

Related U.S. Application Data

(63) Continuation of application No. PCT/CN2020/132660, filed on Nov. 30, 2020.

(51) Int. Cl.
| | |
|---|---|
| *H04N 19/136* | (2014.01) |
| *H04N 19/132* | (2014.01) |
| *H04N 19/423* | (2014.01) |
| *H04N 19/46* | (2014.01) |

(52) U.S. Cl.
CPC ......... *H04N 19/136* (2014.11); *H04N 19/132* (2014.11); *H04N 19/423* (2014.11); *H04N 19/46* (2014.11)

(58) Field of Classification Search
None
See application file for complete search history.

(56) References Cited

U.S. PATENT DOCUMENTS

| | | | |
|---|---|---|---|
| 2013/0081095 A1 | 3/2013 | Kitazato | |
| 2018/0376152 A1 | 12/2018 | Wang et al. | |
| 2019/0222822 A1 | 7/2019 | Wang et al. | |
| 2021/0227232 A1* | 7/2021 | Oh | H04N 21/4345 |
| 2022/0053216 A1 | 2/2022 | Yip et al. | |

FOREIGN PATENT DOCUMENTS

| | | |
|---|---|---|
| CN | 110049330 A | 7/2019 |
| CN | 110771162 A | 2/2020 |
| KR | 20130108080 A | 10/2013 |
| WO | 2017140946 A1 | 8/2017 |
| WO | 2020076058 A1 | 4/2020 |

OTHER PUBLICATIONS

European Search Report issued in EP Patent Application No. 20962997.1, dated Sep. 12, 2023, 10 pages.

(Continued)

*Primary Examiner* — Clifford Hilaire
(74) *Attorney, Agent, or Firm* — Perkins Coie LLP (57) ABSTRACT

Methods, apparatus, and systems that provide flexible encapsulation of volumetric video data in media files are disclosed. In one example aspect, a method for video processing includes receiving three-dimensional (3D) volumetric video data and encoding the three-dimensional volumetric video data into a media file. The 3D volumetric video data corresponds to one or more atlases, each comprising atlas data and one or more two-dimensional (2D) components. The atlas data and the one or more 2D components are stored in one or more media tracks in the media file.

20 Claims, 9 Drawing Sheets

(56) References Cited

OTHER PUBLICATIONS

Nokia Technologies, "V-PCC elementary stream with multiple atlases in ISOBMFF," International Organisation for Standardisation, Organisation Internationale de Normalisation, ISO/IEC JTC1/SC29/WG11, Coding of Moving Pictures and Audio, ISO/IEC JTC1/SC29/WG11 MPEG2020/m52960, Mar. 2020, Electronic meeting, 5 pages.

Graziosi et al., "[VPCC] [EE2.6-related] Mesh Patch Data," International Organisation for Standardisation, Organisation Internationale de Normalisation, ISO/IEC JTC 1/SC 29/WG 7, Coding of Moving Pictures and Audio, ISO/IEC JTC 1/SC 29/WG 7 m 55368, Online—Oct. 2020, 14 pages.

DIS stage, "Information technology—Coded representation of immersive media—Part 10: Carriage of Visual Volumetric Video-based Coding Data," ISO 23090-10:2020(E), ISO/IEC JTC1/SC 29/WG 11, Secretariat: JISC, 2020, 58 pages.

International Preliminary Report on Patentability issued in International Patent Application No. PCT/CN2020/132660, 5 pages.

International Search Report and Written Opinion for International Application No. PCT/CN2020/132660, mailed on Aug. 30, 2021 (7 pages).

\* cited by examiner

ISO file 901 moov
- V3C Track — Sample entry 'v3cb'
- Atlas Track (Atlas_1/2/3) — Sample entry 'v3ca'
- Component Track_1 (Atlas_1/2/3) — Sample entry 'v3cm' (component type I)
- Component Track_2 (Atlas_1/2/3) — Sample entry 'v3cm' (component type II)
- ...

mdat 903
- Sample (Atlas_1/2/3): Atlas_1 Data | Atlas_2 Data | Atlas_3 Data | ...
- Sample (Atlas_1/2/3): Atlas_1 Component 1 | Atlas_2 Component 1 | Atlas_3 Component 1 | ...
- Sample (Atlas_1/2/3): Atlas_1 Component 1 | Atlas_2 Component 1 | Atlas_3 Component 1 | ...
- ...

FIG. 9

MULTI-ATLAS ENCAPSULATION OF IMMERSIVE MEDIA

CROSS REFERENCE TO RELATED APPLICATIONS

This patent document is a continuation of and claims benefit of priority to International Patent Application No. PCT/CN2020/132660, filed on Nov. 30, 2020. The entire content of the before-mentioned patent application is incorporated by reference as part of the disclosure of this application.

TECHNICAL FIELD

This patent document is directed generally to video processing.

BACKGROUND

Users like to experience content the way they see it in real life. With the advancement of technology, immersive media brings content that is more realistic than ever. Immersive media includes the non-traditional formats driven by emerging technology platforms such as 360-degree images and videos, virtual reality (VR), augmented reality (AR), mixed reality (MR), as well as wearables and the internet of things (IoT).

SUMMARY

This patent document describes, among other things, techniques that can be implemented to provide flexible encapsulation of volumetric video data in media files.

In one example aspect, a method for video processing includes receiving three-dimensional (3D) volumetric video data and encoding the three-dimensional volumetric video data into a media file. The 3D volumetric video data corresponds to one or more atlases, each comprising atlas data and one or more two-dimensional (2D) components. The atlas data and the one or more 2D components are stored in one or more media tracks in the media file.

In another example aspect, a method for video processing includes decoding a media file that represents three-dimensional (3D) volumetric video data and reconstructing the 3D volumetric video data based on at least one media track of the one or more media tracks. The 3D volumetric video data corresponds to one or more atlases, each comprising atlas data and one or more two-dimensional (2D) components. The atlas data and the one or more 2D components are stored in one or more media tracks in the media file.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

In yet another example aspect, a computer-program storage medium is disclosed. The computer-program storage medium stores a media file generated according to a method described herein.

These, and other, aspects are described in the present document.

DETAILED DESCRIPTION

Section headings are used in the present document only to improve readability and do not limit scope of the disclosed embodiments and techniques in each section to only that section. The disclosed techniques are applicable to various imaging and/or video standards, including but not limited to the Organization for Standardization (ISO)/International Electrotechnical Commission (IEC) based media file format standards.

Immersive media refers to the use of multimedia technologies such as audio and video to give users an immersive and a completely different media experience. When watching immersive media content, users can participate in the media in real time (e.g., by wearing a virtual reality headset). Immersive media has successfully extended to many fields such as movies, games, news, and/or medical treatment. Immersive media content is different from conventional media content: the visual content is typical 360-degree panoramic visual data that covers a large image area and a wide field of view, providing users more flexibility in tuning to the content based on their own preferences.

Currently, immersive media systems use volumetric video to represent three-dimensional (3D) scenes and objects. The 3D video data is represented by voxels so that any object in the scene can be viewed through movements of six degrees of freedom. Volumetric video can be composed using data collected simultaneously from a plurality of cameras or using a three-dimensional (3D) representation of the data (e.g., point cloud data). The 3D video data is then projected onto two-dimensional (2D) space as 2D patches (also referred to as 2D components). For example, the volumetric video data can be represented a rectangular image after mapping (e.g., an Orthographic Projection image). Alternatively, the volumetric video data can be represented as a rectangular image after mapping and patch packing. In some embodiments, the 3D volumetric video data can be stored in a media file. The characteristic of the 2D data are encapsulated in media files as 2D components, such as geometric, attribute, and/or occupancy map data. In addition to the 2D components, the projection relationship between the 3D space and the 2D space, referred to as atlas data, is also encapsulated in the media files.

The following discussions focus on the ISO basic media file formats. However, the relevant considerations and techniques are applicable to other media file formats, including High Efficiency Video Coding (HEVC) format, Versatile Video Coding (VVC) format, etc.

The ISO basic media file formats such as the restricted scheme information box, track reference box, and track group box are referred to as the Moving Picture Experts Group (MPEG)-4 formulated based on MPEG Part 12 ISO Base Media File Format. The projection, packaging steps and basic format of volume video can be operated with reference to the MPEG-I Part 10 formulated by MPEG. In the ISO basic file format, all data is packed in boxes. That is, the ISO basic file format represented by MP4 files includes several boxes, each having a type and length. Some boxes are referred to as a container box as they can contain one or more other boxes. An MP4 media file includes a "ftyp" type box, which serves as a mark of the file format and includes some information about the file. The "ftyp" type box is followed by one and only one movie box ("MOOV" type box). The movie box is a container box that includes additional boxes comprising metadata information of the media. The media file can include zero or more media data boxes ("MADT" type box). For example, when all the media data refers to other files, the media files includes zero media data box. The media data box is also a container box that includes additional boxes comprising the media data. The structure of the media data is determined by the metadata description. To further support the metadata description of the media, a metadata box (a "meta" type box) can be optionally used to describe some general or additional non-timed metadata.

Figure 1:
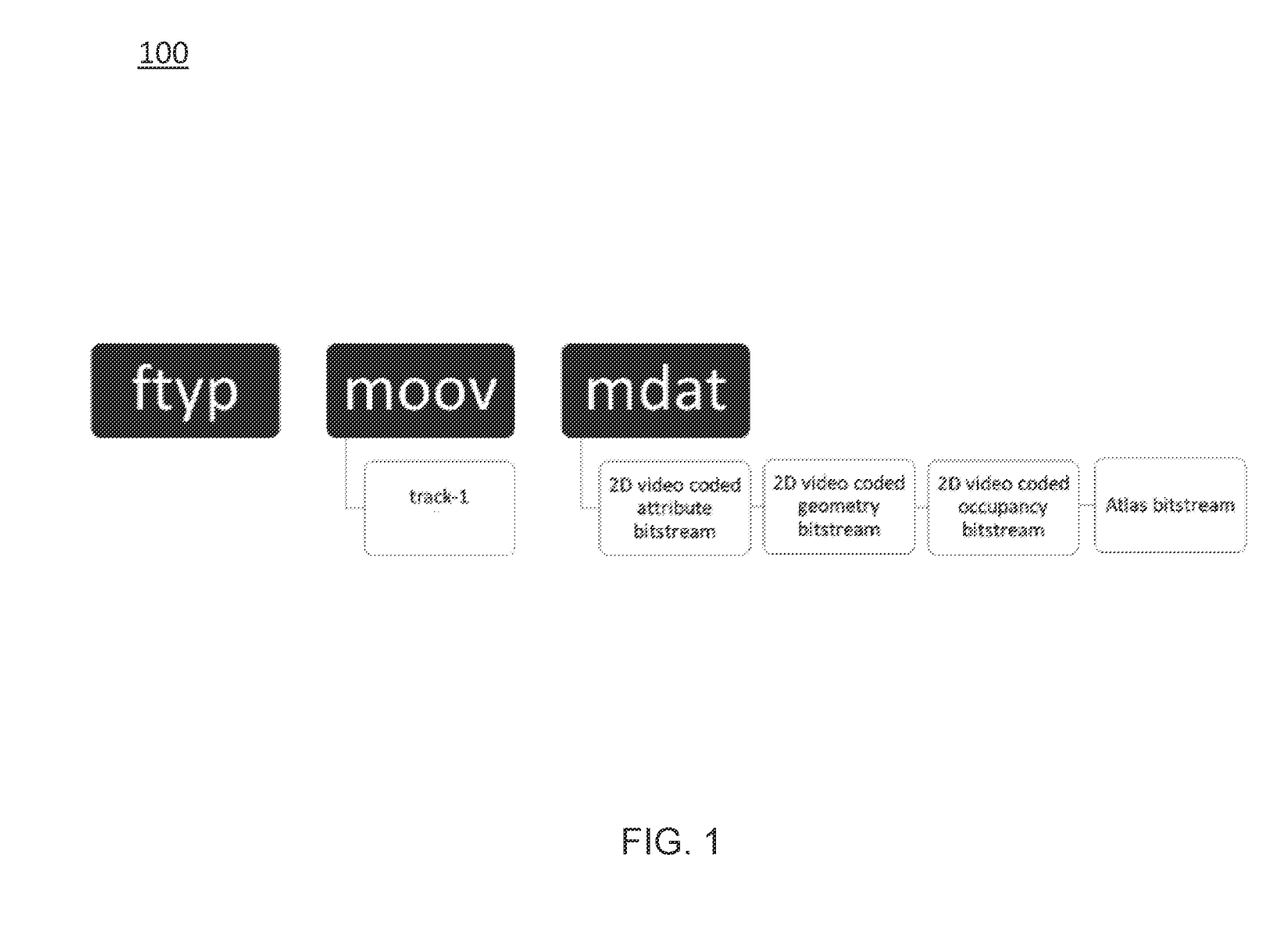
FIG. 1 illustrates an example structure of a media file.
Figure 2:
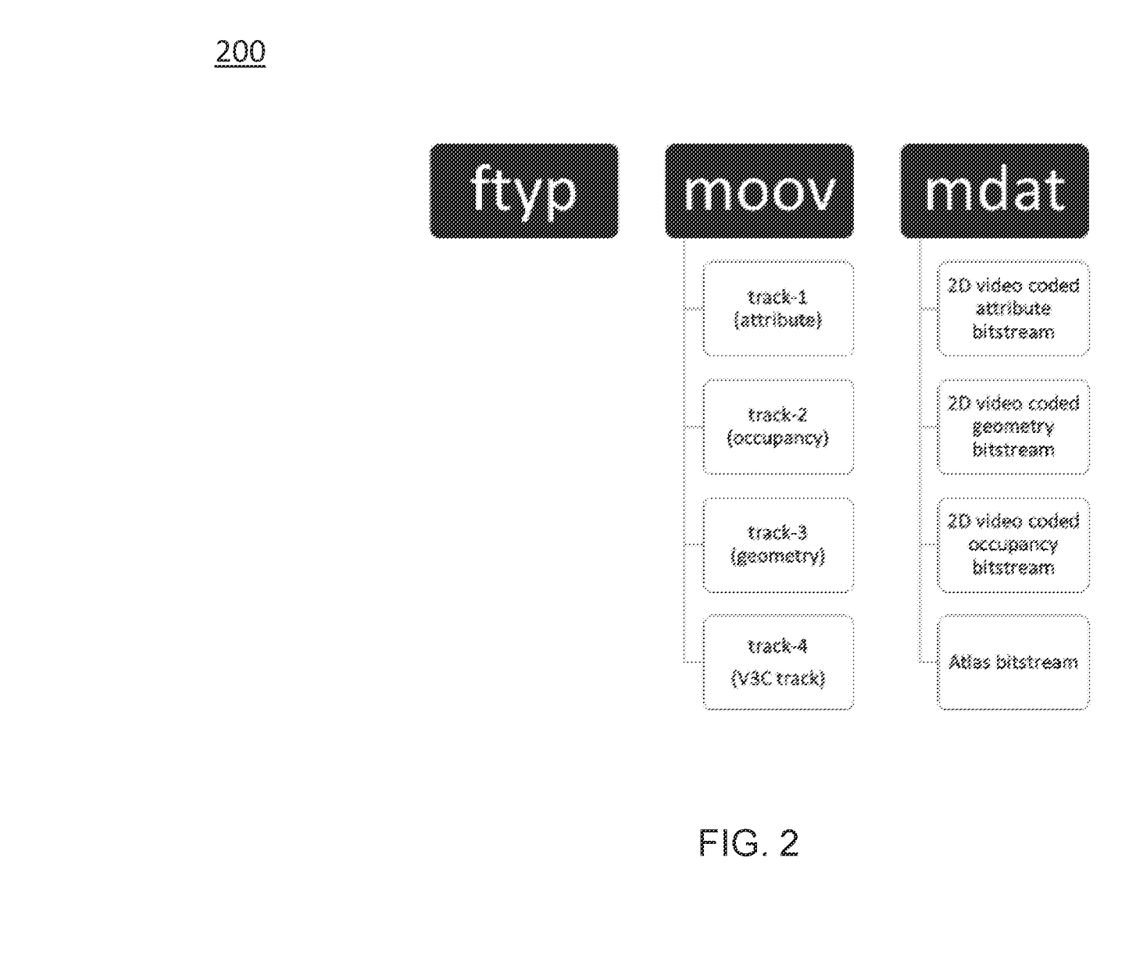
FIG. 2 illustrates another example structure of a media file.

As discussed above, the 2D representation of the volumetric video projected to the 2D plane is represented by 2D component data, including geometric component data, attribute component data, and/or occupancy component data. The atlas data represents the projection relationship between the 3D space and the 2D plane. There can be at least two types of tracks in a multi-track encapsulated video data container: a volumetric visual track which carries the atlas information, such as atlas parameter information or atlas bitstream (also referred to as V3C track); and a video track that carries 2D video encoded data for any of the occupancy, geometry, or attribute component video bitstreams (also referred to as a V3C component track). FIG. 1 illustrates an example structure of a media file. According to the ISO/IEC coding standard, for example, a container file can include a single-track encapsulation of volumetric data (e.g., track-1). That is, the corresponding bitstream is represented by a single-track declaration in the media file. In some embodiments, multiple volumetric visual tracks can be present in the file as well. FIG. 2 illustrates another example structure of a media file. In the example shown in FIG. 2, data is mapped to individual tracks within the container file based on the component types.

The single-track encapsulation of V3C data as shown in FIG. 1 can be used in simple encapsulation of a V3C encoded bitstream. However, the single-track encapsulation offers very little flexibility for complex 3D scenes. Because everything is encapsulated in the single track, all data needs to be transmitted for decoding purposes, leading to potential waste of bandwidth and processing power.

The multi-track encapsulation provides more flexibility for complex scenes, allowing different types of component data to be separated into different tracks. As shown in FIG. 2, each video track carries a single type of component video bitstream. However, decoding the video data often requires multiple components of the video data (e.g., geometry and texture). Yet decoding a number of video bitstreams in parallel can lead to synchronization and memory utilization issues. For example, synchronization of multiple video bitstreams is challenging when a decoder skips a frame.

Implementation complexity can increase significantly for multi-stream synchronization, leading to unnecessary upfront delay at decoding time. Furthermore, the 3D to 2D projection can result in multiple atlases. For example, when the volumetric video is composed using data from a plurality of cameras, one atlas can be constructed for data from one or more selected cameras. In some embodiments, the captured images from multiple cameras can overlap or repeat in part. Culling can be performed to the overlapped portions before the captured images are encoded into an atlas. The multi-track encapsulation structure as shown in FIG. 2 fails to provide data transmission and/or decoding flexibility when only a subset of atlases is needed.

This patent document discloses techniques that can be implemented in various embodiments to provide more flexible encapsulation schemes to reduce decoding complexity and to increase bandwidth consumptions. In some embodiments, the disclosed techniques can be implemented to allow encapsulation of multiple atlases in the media boxes, thereby allowing video processing to be performed on an atlas basis. The component tracks can be organized based on the corresponding atlases and/or component types, thereby reducing or minimizing synchronization need on the decoding side.

Figure 3:
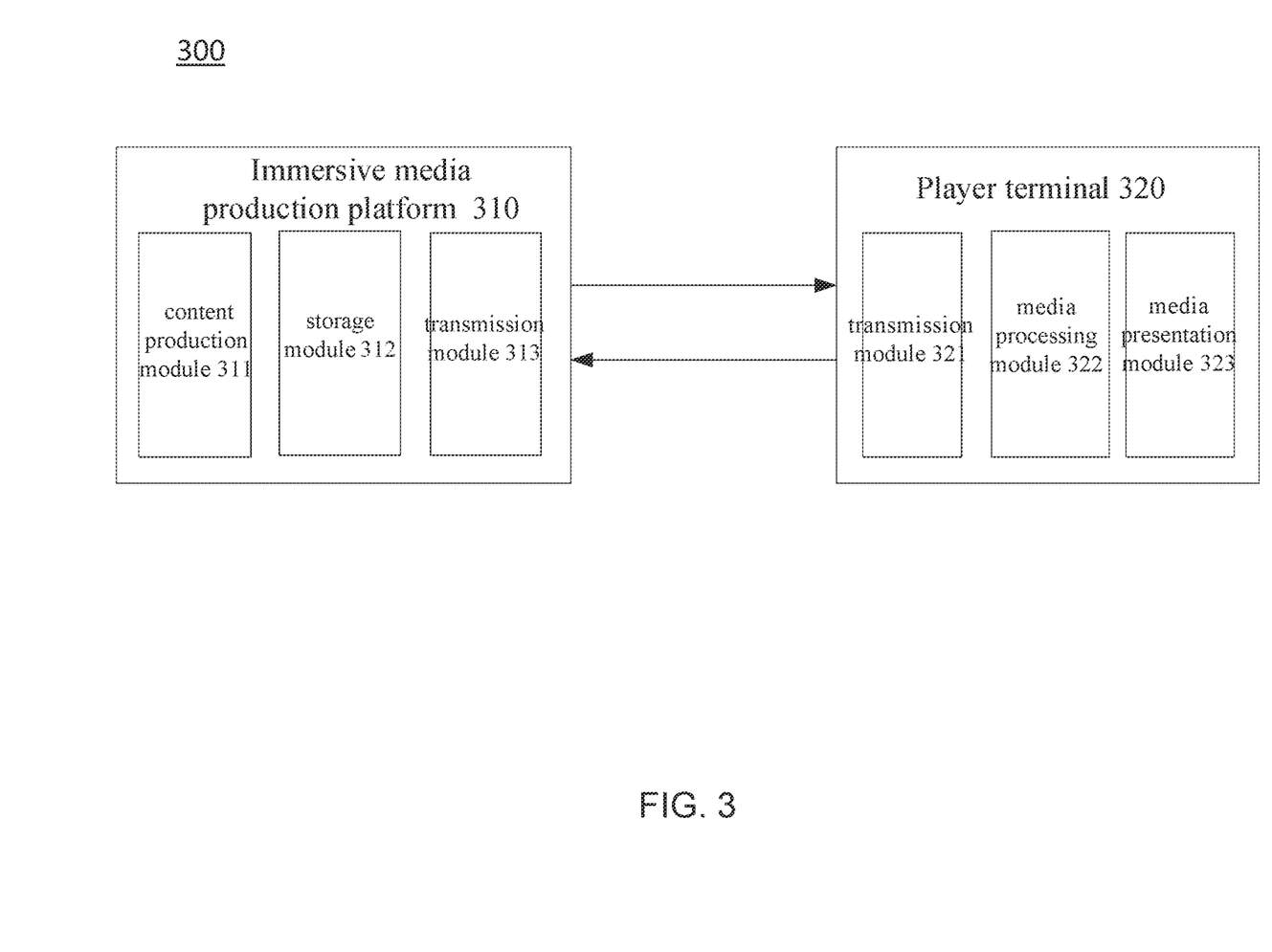
FIG. 3 illustrates an example encoding and decoding process for volumetric video data in accordance with the present technology.

FIG. 3 illustrates an example encoding and decoding process for volumetric video data in accordance with the present technology. As shown in FIG. 3, the immersive media system 300 includes an immersive media production platform 310 (encoder side) and player terminal 320 (decoder side). The immersive media production platform 310 includes at least a content production module 311, a storage module 312, and a transmission module 313. The content production module 311 is used for encoding and encapsulation processing of the captured volumetric video. The storage module 312 is used to store encapsulated media files. The transmission module 313 is used to receive request message from client terminal and/or to transmit data (such as media file) stored in the storage module 312. The reception and/or transmission of the video data can be performed through a wireless network provided by a communication provider, a local wireless area network, or a wired method.

The player terminal 320 includes at least a transmission module 321, a media processing module 322, and a media presentation module 323. The transmission module 321 is used to receive data (e.g., media files) and/or to transmit messages (e.g., media file requests) to the transmission module 313. The media processing module 322 is used to decode and decapsulate the received media file, and reconstruct the volumetric video according to the user's current viewing state, such as viewing position, viewing direction, etc. The media processing module 322 also performs rendering processing. The media presentation module 323 is used to present the reconstructed volumetric video in the user's viewport.

Figure 4:
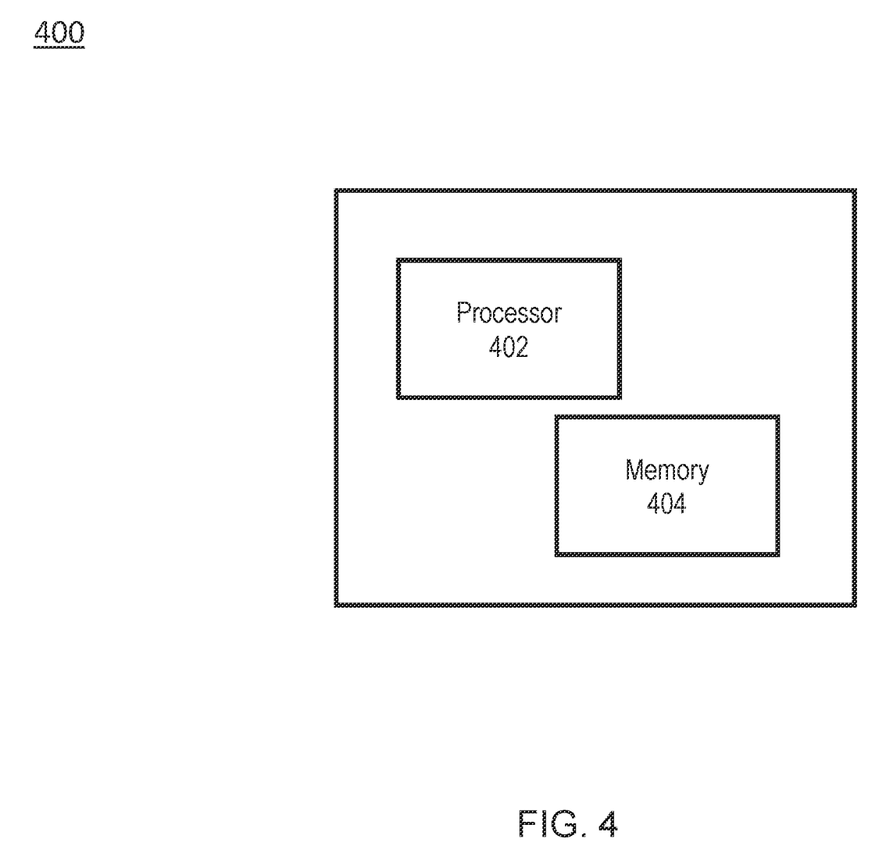
FIG. 4 shows an example apparatus that may be used to implement encoder-side or decoder-side modules in accordance with the present technology.

FIG. 4 shows an example apparatus 400 that may be used to implement encoder-side or decoder-side modules in accordance with the present technology. The apparatus 400 includes a processor 402 that may be configured to perform the encoder-side or decoder-side techniques or both. The apparatus 400 may also include a memory (404) for storing processor-executable instructions and for storing the video bitstream and/or display data. The apparatus 400 may include video processing circuitry (not shown), such as transform circuits, arithmetic coding/decoding circuits, and so on. The video processing circuitry may be partly included in the processor and/or partly in other dedicated circuitry such as graphics processors, field programmable gate arrays (FPGAs) and so on.

Figure 5:
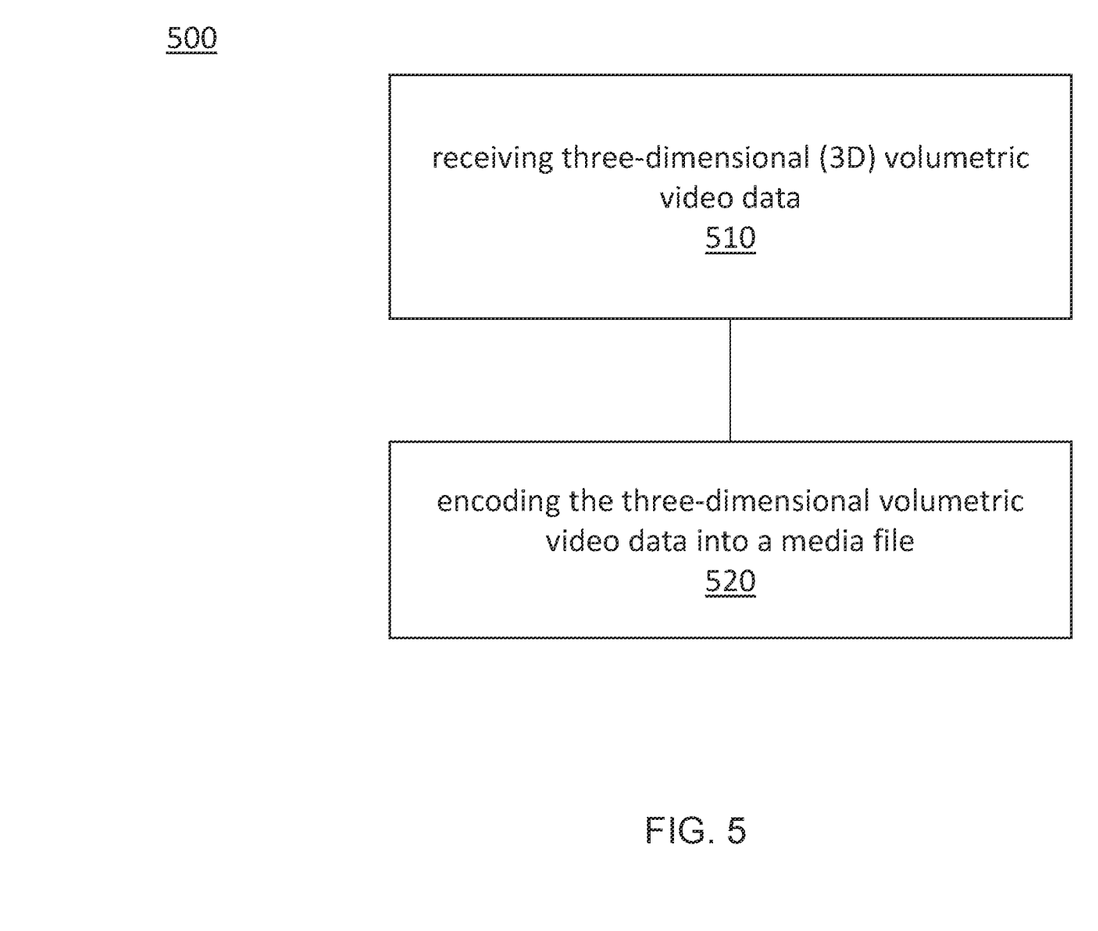
FIG. 5 is a flowchart representation of a method for video encoding in accordance with the present technology.

FIG. 5 is a flowchart representation of a method 500 for video encoding in accordance with the present technology. The method 500 includes, at operation 510, receiving three-dimensional (3D) volumetric video data. The method 500 also includes, at operation 520, encoding the three-dimensional volumetric video data into a media file. The 3D volumetric video data corresponds to one or more atlases, each comprising atlas data and one or more two-dimensional (2D) components. The atlas data and the one or more 2D components are stored in one or more media tracks in the media file.

Figure 6:
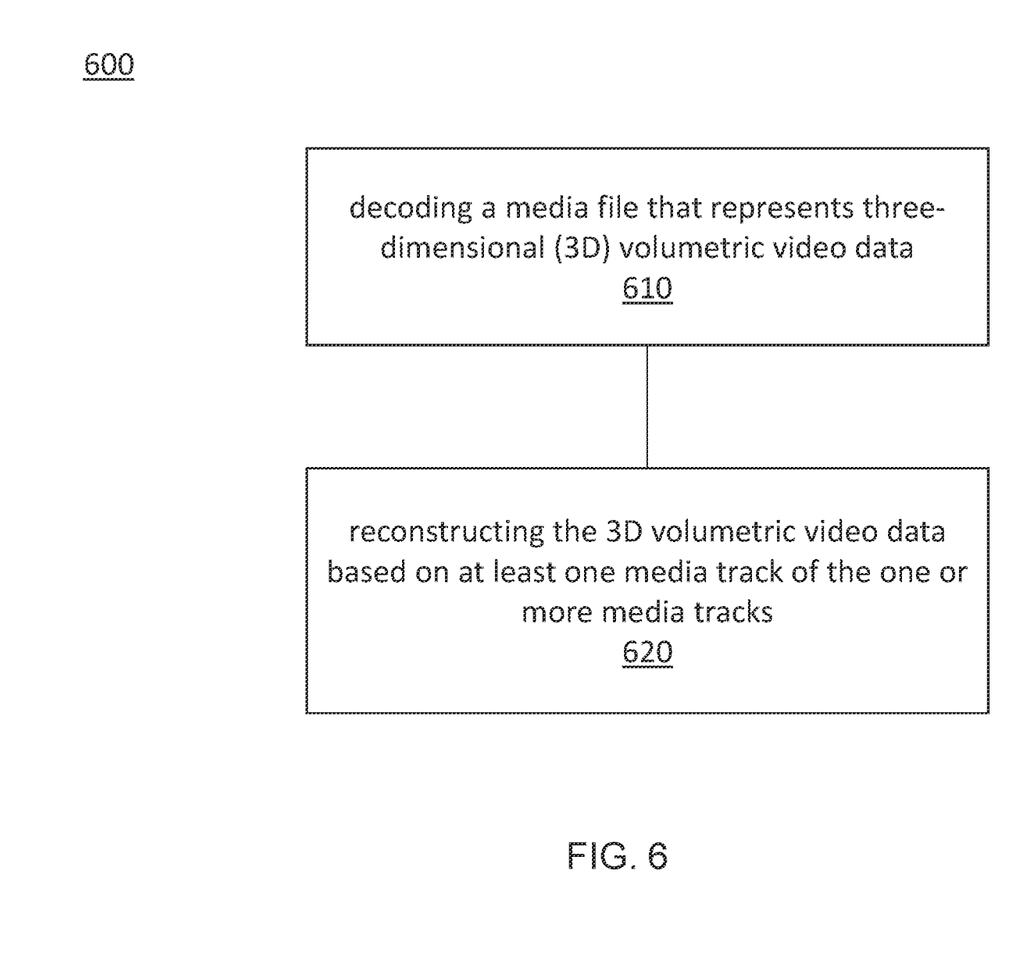
FIG. 6 is a flowchart representation of another method for video encoding in accordance with the present technology.

FIG. 6 is a flowchart representation of a method 600 for video decoding in accordance with the present technology. The method 600 includes, at operation 610, decoding a media file that represents three-dimensional (3D) volumetric video data. The 3D volumetric video data corresponds to one or more atlases, each comprising atlas data and one or more two-dimensional (2D) components. The atlas data and the one or more 2D components are stored in one or more media tracks in the media file. The method 600 also includes, at operation 620, reconstructing the 3D volumetric video data based on at least one media track of the one or more media tracks.

In both the encoding and decoding cases, the one or more 2D components for each atlas comprise at least a geometry component, an occupancy component, or an attribute component. In some embodiments, the atlas data comprises projection relationship of projecting the 3D volumetric video data from a 3D space to a 2D plane. In some embodiments, the at least one media track in the media file includes information that represents a part or all of the 3D volumetric video data. For example, a subset of tracks of all the tracks stored in the media file is transmitted for decoding to reduce transmission cost.

In some embodiments, the one or more media tracks includes a volumetric visual track with a specific sample entry type (e.g., V3C). The volumetric visual track comprising parameter information common to all of the one or more atlases. In some embodiments, the volumetric visual track includes zero sample. In some embodiments, the volumetric visual track includes one or more samples, each sample carrying atlas data for one or more atlases.

In some embodiments, the one or more media tracks includes one or more atlas tracks with a specific sample entry type (e.g., 'v3ca' as described in Embodiment 3 below). The atlas track comprises atlas data of one or more atlases.

In some embodiments, the one or more media tracks includes one or more first component tracks with a first sample entry type (e.g., 'v3cc' as described in Embodiment 1 below). The first component track comprises data of the one or more components corresponding to the one or more atlases. In some embodiments, the one or more media tracks includes one or more second component tracks with a second sample entry type (e.g., 'v3ac' as described in Embodiment 2 below). The second component track comprises the atlas data and data of the one or more components corresponding to the one or more atlases. In some embodiments, the one or more media tracks includes one or more third component tracks with a third sample entry type (e.g., 'v3 cm' as described in Embodiment 3 below). The third component track carrying a particular type of component data from the one or more atlases.

In some embodiments, the one or more media tracks are organized into multiple groups. In some embodiments, each group corresponds to one of the one or more atlases. In some embodiments, each group corresponds to multiple atlases that are arranged together due to a grouping criterion associated with the 3D volumetric video data, such as the location of the views in the 3D scene.

In some embodiments, a media file encoded according to one of the above described encoding methods may be stored on a computer-readable medium.

Some examples of the disclosed techniques are further described in the following example embodiments.

Embodiment 1

Figure 7:
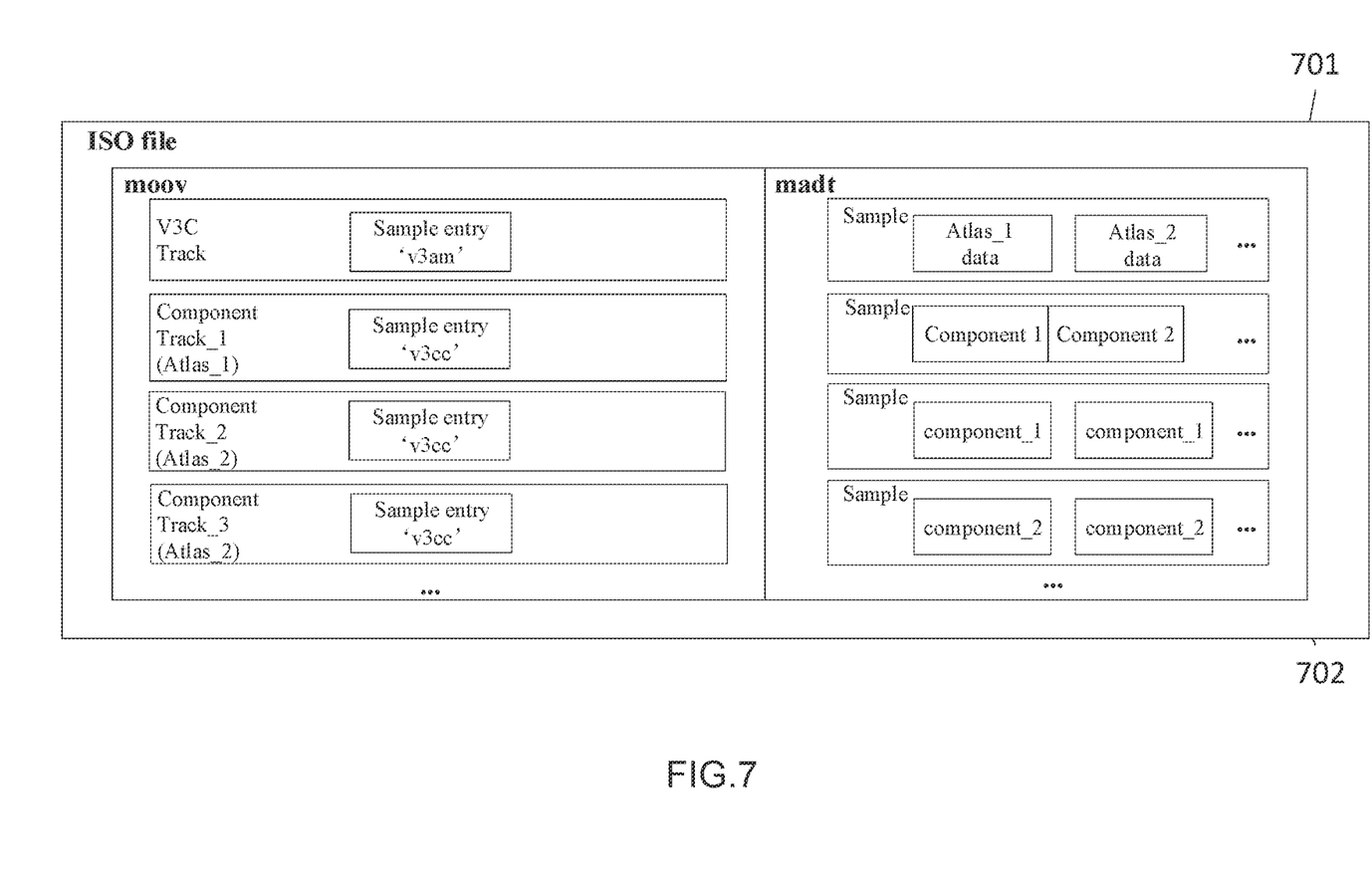
FIG. 7 illustrates an example encapsulation structure of a media file in accordance with the present technology.

In some embodiments, atlas data of all atlases is stored in the same track (e.g., V3C track). FIG. 7 illustrates an example encapsulation structure 700 of a media file in accordance with the present technology. As shown in FIG. 7, the media file of the volumetric video (e.g., the ISO file) includes a V3C volumetric visual track identified by the sample entry with type 'v3 am' in the MOOV box. The V3C volumetric visual track includes parameter information of the volumetric video and/or atlas information that is common to all the atlases.

The VC3 volumetric visual track can includes one or more corresponding samples. When there is at least one sample, the corresponding MDAT box stores the parameter information of the volumetric video, atlas parameter information, and/or data of all atlases.

The V3C component tracks can be represented in the media file as restricted video and identified by "vvvc" in the scheme type field of the SchemeTypeBox corresponding to the video sample entries. In some embodiments, different types of the component data corresponding to the atlas are stored in one V3C component track. As shown in FIG. 7, Atlas_1 (701) has multiple components of different types, including Component 1, Component 2, etc. All the components corresponding to Atlas_1 are stored in the same V3C component track. That is, characteristics such as geometry, attributes and occupancy data for Atlas_1 are organized together, reducing synchronization complexity for processing Atlas_1.

In some embodiments, an atlas can correspond to multiple tracks that are organized based on component types. As shown in FIG. 7, Atlas_2 (702) corresponds to two tracks. Each track corresponds to a particular component type. For example, Track_2 corresponds to component type 1 while Track_3 corresponds to component type 2.

A syntax example for the V3C volumetric visual track sample entry is shown in the table below:

Sample Entry Type: v3am
Container: SampleDescriptionBox
Mandatory: optional mandatory
Quantity: One or more sample entries may be present
aligned(8) class V3CSampleEntry( ) extends
VolumetricVisualSampleEntry ('v3am') {
  V3CConfigurationBox config;
  unsigned int(1) multi_atlas_flag;
  unsigned int(8) num_atlas;
  for(i=0; i < num_atlas; i++){
    V3CUnitHeaderBox unit_header;
    unsigned int(8) atlas_id;
    unsigned int(1) mix_component_flag;
    if(mix_component_flag)
      unsigned int(32) component_group_id;
    else

```
    unsigned int(32) atlas_reference_track_id;
  }
}
```

The variables in the above table have the following definitions:

multi_atlas_flag indicates whether the media track includes multiple atlas.

num_atlas indicates the number of atlases included in the media track.

atlas_id indicates the identifier of the atlas.

unit_header is a v3c_unit_header( ) as defined in the ISO/JEC format.

mix_component_flag indicates whether the component data is stored in a same media track. Value of 0 indicates that the components are stored in separate media tracks. Value of 1 indicates that the components are stored in the same media track.

component_group_id indicates the identifier (ID) of the media track group that stores all the component data belonging to the same atlas.

atlas_referce_track_id indicates reference TD of the media track where all the component data corresponding to the atlas is stored.

The V3C media track may use track reference or other method have been defined in the ISO/JEC format to refer/link to corresponding component media track(s).

The V3C component track includes different types of component data is identified by the sample entry of type 'v3cc'. The V3C component track can include component data from one atlas or multiple atlases. A syntax example for the V3C component track sample entry is show in the table below:

```
Sample Entry Type:    'v3cc'
Container:            SampleDescriptionBox
Mandatory:            optional mandatory
Quantity:             One or more sample entries may be present
aligned(8) class V3CComponentSampleEntry( ) extends
VolumetricVisualSampleEntry ('v3cc') {
  unsigned int(1) mix_component_flag;
  unsigned int(8) num_atlas;
  for(i=0; i < num_atlas; i++){
  unsigned int(8) atlas_id;
  V3CUnitHeaderBox unit_header;
  unsigned int(1) atlas_tile_flag;
  if(atlas_tile_flag){
     unsigned int(8) num_tile;
     for(i=0; i< num_tile; i++)
         tile_id;
     }
  if(mix_component_flag)
     unsigned int(8) num_component;
     for(j=0;j< num_component;j++)
         unsigned int(8) component_type;
     }
  }
}
```

The variables in the above table have the following definitions:

mix_component_flag indicates whether the component data is stored in a same media track. Value of 0 indicates that the components are stored in separate media track. Value of 1 indicates that the components are stored in the same media track.

num_atlas indicates the number of atlases included in the media track.

atlas_id indicates the identifier of the atlas.

atlas_tile_flag indicate whether the component track includes atlas tiles. Value of 0 indicates that the component track does not include atlas tiles. Value of 1 indicates that the component track includes one or more atlas tile(s).

num_tile indicates the number of atlas tile.

tile_id indicates the identifier of the atlas tile.

num_component indicates the number of components in the media track.

component_type indicates the type of component data.

unit_header is a v3c_unit_header( ) as defined in the ISO/JEC format.

Embodiment 2

Figure 8:
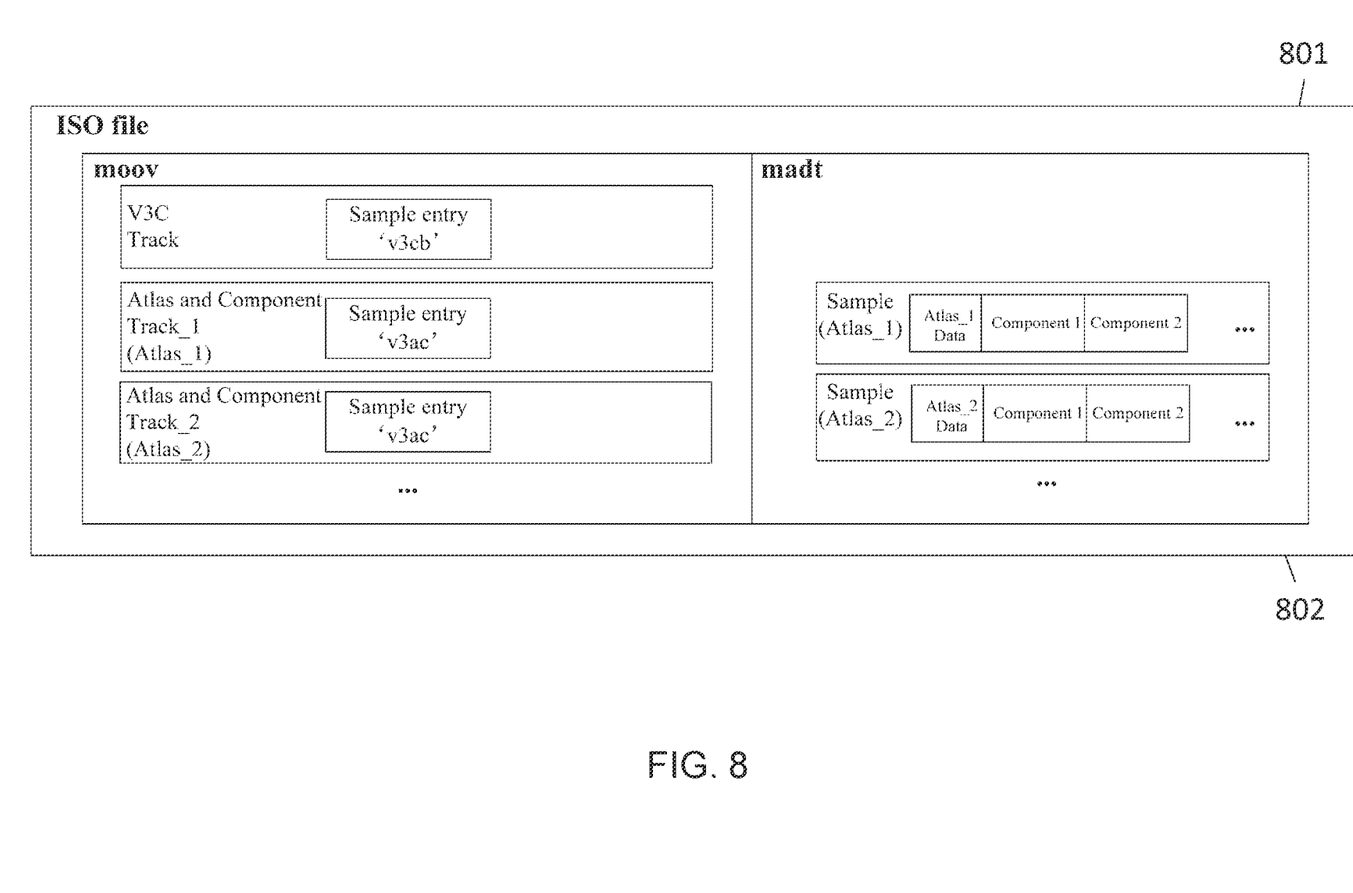
FIG. 8 illustrates an example encapsulation structure of a media file in accordance with the present technology.

In some embodiments, atlas data and component data of each atlas is stored in the same track. FIG. 8 illustrates an example encapsulation structure 800 of a media file in accordance with the present technology. The media file of the volumetric video includes a V3C track which stores atlas information that is common to all atlases. In this example, the V3C track includes zero sample. Therefore, the MADT box does not include any sample data for the V3C track.

Atlas data that is not common to all atlases can be stored with the corresponding component data for the particular atlas. As shown in FIG. 8, for Atlas_1 (801), Atlas_1 data and all the component data of different types (component 1, component 2) are stored in the same track. Similarly, for Atlas_2 (801), Atlas_2 data and all the component data of different types (component 1, component 2) are stored in the same track. That is, all relevant data for a particular atlas is packed together in a track, thereby minimizing synchronization delays and increasing transmission flexibility.

Here, the V3C atlas and component tracks can be identified by the sample entry of type 'v3ac'. A syntax example for the V3C atlas and component track sample entry is shown in the table below:

```
Sample Entry Type:    'v3ac'
Container:            SampleDescriptionBox
Mandatory:            optional mandatory (if multiple atlas)
Quantity:             One or more sample entries may be present
aligned(8) class V3CAtlasAndComponentSampleEntry( ) extends
VolumetricVisualSampleEntry ('v3ca') {
  unsigned int(8) configurationVersion = 1;
  unsigned int(8) multi_atlas_flag;
  unsigned int(8) num_atlas;
  for(i=0; i < num_atlas; i++){
     V3CUnitHeaderBox unit_header;
     unsigned int(32) atlas_id;
  }
}
```

The variables in the above table have the following definitions:

atlas_id indicates the identifier of the atlas.

multi_atlas_flag indicates that the media track includes multiple atlas.

num_atlas indicates the number of atlases included in the media track.

unit_header is a v3c_unit_header( ) as defined in the ISO/IEC format.

Embodiment 3

Figure 9:
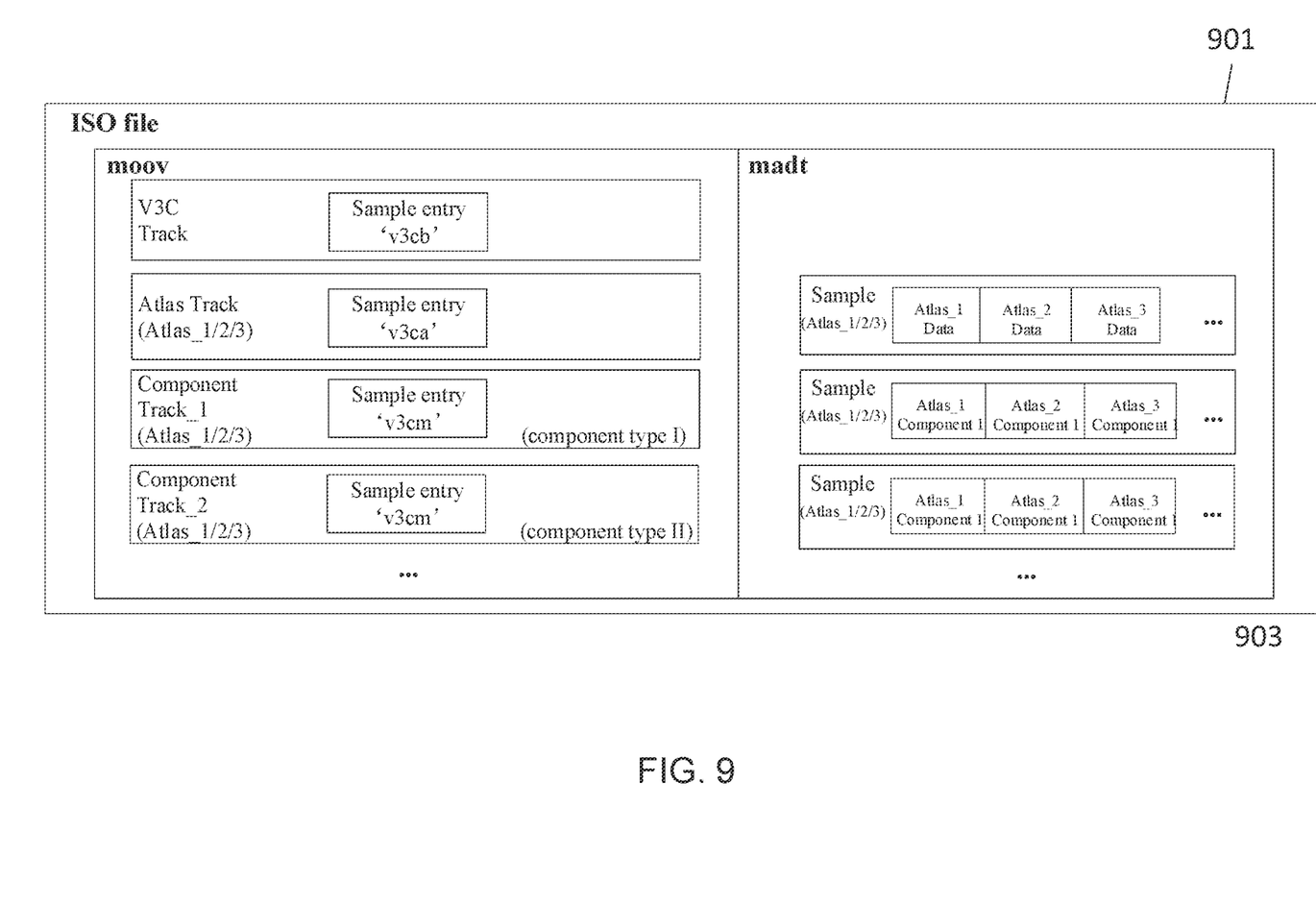
FIG. 9 illustrates an example encapsulation structure of a media file in accordance with the present technology.

In some embodiments, component data of the same type from one or more atlases is stored in the same media track. Component data of all atlases can be organized in groups based on a grouping criterion, e.g., based on the component types. FIG. 9 illustrates an example encapsulation structure 900 of a media file in accordance with the present technology. Similar to Embodiment 2, the media file includes a V3C track which stores atlas information that is common to all atlases, and the V3C track includes zero sample. Therefore, the MADT box does not include any sample data for the V3C track.

In this embodiment, the media file includes a separate atlas track 901 (e.g., identified by entry type 'v3ca') to store the atlas parameter information and/or data of all atlases. Multiple atlases are organized in one groups based on grouping criteria. For example, multiple atlases can correspond to multiple cameras layouts in a 3D region that corresponds to the 3D volumetric video data. For example, as shown in FIG. 9, component data of component type I of multiple atlases (Atlas_1, Atlas_2, and Atlas_3, belongs to one group) is stored in V3C component track 902. Similarly, component data of component type II of multiple atlases (Atlas_1 Atlas_2 and Atlas_3) is stored in V3C component track 903. That is, each V3C component track can include component data from one or more atlases. Such organization enables more efficient processing when the decoding side needs to examine one particular component type only.

In addition to component types, the component tracks and the V3C atlas track can be organized into groups according to other grouping criteria. For example, the component tracks store all type of component data of one group of multiple atlases, then can be component tracks and the V3C atlas track can be grouped into one group. Various grouping criteria can be used to enable efficiency partial processing of the 3D volumetric video data according to the characteristics of the 3D scene.

A syntax example for the V3C atlas track sample entry is shown in the table below:

```
Sample Entry Type:    'v3ca'
Container:            SampleDescriptionBox
Mandatory:            optional mandatory (if multiple atlas)
Quantity:             One or more sample entries may be present
aligned(8) class V3CAtlasSampleEntry( ) extends
VolumetricVisualSampleEntry ('v3ca') {
   unsigned int(8) configurationVersion = 1;
   unsigned int(8) num_atlas;
   for(i=0; i < num_atlas; i++){
      V3CUnitHeaderBox unit_header;
      unsigned int(8) atlas_id;
   }
   if(atlas_group_flag)
   unsigned int(32) atlas_group_id;
}
```

The variables in the above table have the following definitions:
multi_atlas_flag indicates the media track includes multiple atlas.
num_atlas indicates the number of atlases included in the media track.
atlas_id indicates the identifier of the atlas.
atlas_group_flag indicates all of the atlases in the V3C atlas track are grouped into one group.
atlas_group_id indicates ID of the group that all of the atlases in the V3C atlas track belong to.
unit_header is a v3c_unit_header( ) as defined in the ISO/JEC format.

The V3C component media track can be identified by the sample entry of type 'v3 cm'. A syntax example for the V3C component track sample entry is shown in the table below:

```
Sample Entry Type:    'v3cm'
Container:            SampleDescriptionBox
Mandatory:            optional mandatory
Quantity:             One or more sample entries may be present
aligned(8) class V3CComponentSampleEntry( ) extends
VolumetricVisualSampleEntry ('v3cm') {
   unsigned int(8) configurationVersion = 1;
   unsigned int(8) component_type;
   unsigned int(8) num_atlas;
   for(i=0; i < num_atlas; i++)
      unsigned int(32) atlas_id;
      V3CUnitHeaderBox unit_header;
   }
}
```

The variables in the above table have the following definitions:
component_type indicates the type of component.
num_atlas indicates the number of atlases included in the media track.
atlas_id indicates the identifier of the atlas.
unit_header is a v3c_unit_header( ) as defined in the ISO/JEC format.

It will be appreciated that the present document discloses techniques that can be embodied in various embodiments to provide flexible encapsulation of 3D volumetric video data. The disclosed techniques allow multiple atlases to be encapsulated into a single media file. The atlas data and the component data of each atlas can be organized in different ways to reduce transmission cost and minimize synchronization complexity. The disclosed media content processing system and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document includes many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for video processing, comprising:
   receiving three-dimensional (3D) volumetric video data; and
   encoding the 3D volumetric video data into a media file according to a file format,
   wherein the 3D volumetric video data corresponds to atlases, each atlas comprising atlas data and one or more two-dimensional (2D) components, and wherein the file format specifies that the atlas data and the one or more 2D components of each atlas are stored in one or more media tracks in the media file, wherein the file format further specifies at least one 2D component of the one or more 2D components that corresponds to an atlas is stored in a component track of the one or more media tracks, and wherein a part of the atlas data that the at least one 2D component corresponds to and is not common to all of the atlases is stored in the component track.

2. The method of claim 1, wherein the one or more 2D components for each atlas comprise at least a geometry component, an occupancy component, or an attribute component.

3. The method of claim 1, wherein the atlas data comprises projection relationship of projecting the 3D volumetric video data from a 3D space to a 2D plane.

4. The method of claim 1, wherein the one or more media tracks includes a volumetric visual track with a specific sample entry type, the volumetric visual track comprising parameter information common to all of the atlases.

5. The method of claim 1, wherein the one or more media tracks are organized into multiple groups, each group corresponding to the atlases arranged according to a grouping criterion associated with the 3D volumetric video data.

6. A method for video processing, comprising:
   decoding a media file that represents three-dimensional (3D) volumetric video data according to a file format,
   wherein the 3D volumetric video data corresponds to atlases, each atlas comprising atlas data and one or more two-dimensional (2D) components, and wherein the file format specifies that the atlas data and the one or more 2D components of each atlas are stored in one or more media tracks in the media file, wherein the file format further specifies at least one 2D component of the one or more 2D components that corresponds to an atlas is stored in a component track of the one or more media tracks, and wherein a part of the atlas data that the at least one 2D component corresponds to and is not common to all of the atlases is stored in the component track; and
   reconstructing the 3D volumetric video data based on at least one media track of the one or more media tracks.

7. The method of claim 6, wherein the one or more 2D components for each atlas comprise at least a geometry component, an occupancy component, or an attribute component.

8. The method of claim 6, wherein the atlas data comprises projection relationship of projecting the 3D volumetric video data from a 3D space to a 2D plane.

9. The method of claim 6, wherein the one or more media tracks includes a volumetric visual track with a specific sample entry type, the volumetric visual track comprising parameter information common to all of the atlases.

10. The method of claim 6, wherein the one or more media tracks are organized into multiple groups, each group corresponding to the atlases arranged according to a grouping criterion associated with the 3D volumetric video data.

11. A video processing apparatus comprising a processor and a non-transitory memory with instructions thereon, wherein the instructions upon execution by the processor, cause the processor to:

receive three-dimensional (3D) volumetric video data; and encode the 3D volumetric video data into a media file according to a file format, wherein the 3D volumetric video data corresponds to atlases, each atlas comprising atlas data and one or more two-dimensional (2D) components, and wherein the file format specifies that the atlas data and the one or more 2D components of each atlas are stored in one or more media tracks in the media file, wherein the file format further specifies at least one 2D component of the one or more 2D components that corresponds to an atlas is stored in a component track of the one or more media tracks, and wherein a part of the atlas data that the at least one 2D component corresponds to and is not common to all of the atlases is stored in the component track.

12. The apparatus of claim 11, wherein the one or more 2D components for each atlas comprise at least a geometry component, an occupancy component, or an attribute component.

13. The apparatus of claim 11, wherein the atlas data comprises projection relationship of projecting the 3D volumetric video data from a 3D space to a 2D plane.

14. The apparatus of claim 11, wherein the one or more media tracks includes a volumetric visual track with a specific sample entry type, the volumetric visual track comprising parameter information common to all of the atlases.

15. The apparatus of claim 11, wherein the one or more media tracks are organized into multiple groups, each group corresponding to the atlases arranged according to a grouping criterion associated with the 3D volumetric video data.

16. A video processing apparatus comprising a processor and a non-transitory memory with instructions thereon, wherein the instructions upon execution by the processor, cause the processor to:

decode a media file that represents three-dimensional (3D) volumetric video data according to a file format, wherein the 3D volumetric video data corresponds to atlases, each atlas comprising atlas data and one or more two-dimensional (2D) components, and wherein the file format specifies that the atlas data and the one or more 2D components of each atlas are stored in one or more media tracks in the media file, wherein the file format further specifies at least one 2D component of the one or more 2D components that corresponds to an atlas is stored in a component track of the one or more media tracks, and wherein a part of the atlas data that the at least one 2D component corresponds to and is not common to all of the atlases is stored in the component track; and reconstruct the 3D volumetric video data based on at least one media track of the one or more media tracks.

17. The apparatus of claim 16, wherein the one or more 2D components for each atlas comprise at least a geometry component, an occupancy component, or an attribute component.

18. The apparatus of claim 16, wherein the atlas data comprises projection relationship of projecting the 3D volumetric video data from a 3D space to a 2D plane.

19. The apparatus of claim 16, wherein the one or more media tracks includes a volumetric visual track with a specific sample entry type, the volumetric visual track comprising parameter information common to all of the atlases.

20. The apparatus of claim 16, wherein the one or more media tracks are organized into multiple groups, each group corresponding to the atlases arranged according to a grouping criterion associated with the 3D volumetric video data.

\* \* \* \* \*